United States Patent [19]

Koyama et al.

[11] Patent Number: 5,731,855
[45] Date of Patent: Mar. 24, 1998

[54] LIQUID CRYSTAL DISPLAY DEVICE HAVING A FILM FOR PROTECTING INTERFACE BETWEEN INTERLAYER INSULATING FILM AND UNDERLYING LAYER AND MANUFACTURING METHOD THEREOF

[75] Inventors: Tetsurou Koyama; Yasunobu Tagusa, both of Nara; Masaya Okamoto, Kyoto, all of Japan

[73] Assignee: Sharp Kabushiki Kaisha, Osaka, Japan

[21] Appl. No.: 721,328

[22] Filed: Sep. 26, 1996

[30] Foreign Application Priority Data

Sep. 27, 1995 [JP] Japan .................................. 7-249514

[51] Int. Cl.$^6$ ............................ G02F 1/1345; G02F 1/136
[52] U.S. Cl. ................................ 349/43; 349/54; 349/139
[58] Field of Search ................................ 349/42, 138, 43, 349/122, 54, 55, 139, 149, 151, 152, 192; 445/24; 257/59, 72; 345/92

[56] References Cited

U.S. PATENT DOCUMENTS

| | | | |
|---|---|---|---|
| 4,688,896 | 8/1987 | Castleberry | 349/55 |
| 5,032,883 | 7/1991 | Wakai et al. | 257/59 |
| 5,187,604 | 2/1993 | Taniguchi et al. | 349/42 |
| 5,335,102 | 8/1994 | Kanemori et al. | 349/55 |
| 5,510,918 | 4/1996 | Matsunaga et al. | 349/46 |
| 5,621,556 | 4/1997 | Fulks et al. | 349/42 |
| 5,623,350 | 4/1997 | Kawachi et al. | 349/139 |

FOREIGN PATENT DOCUMENTS

| | | |
|---|---|---|
| 58-184929 | 10/1983 | Japan . |
| 62-135810 | 6/1987 | Japan . |
| 1-35351 | 7/1989 | Japan . |
| 4307521 | 10/1992 | Japan . |
| 4-74714 | 11/1992 | Japan . |
| 6-230422 | 8/1994 | Japan . |
| 7-36043 | 2/1995 | Japan . |
| 7-122719 | 12/1995 | Japan . |

OTHER PUBLICATIONS

Fujita et al, "Colorless Polyimide," Nitto Giho, vol. 29, No. 1, pp. 20–28, Jun. 1991.
"Application of a Wide Viewing Angle Technique Essential for a Large-Area Display to Mass Production Panel of TFT Starts," Flat-Panel Display '94, p. 166, Dec. 1993.
"Backlight," Flat-Panel Display '94, p. 217, Dec. 1993.
"Mass Production of CMP is full-Fledged to be Applied to ASIC and DRAM," Nikkei Microdevices, pp. 50–57, Jul. 1994.
Kim et al., "4:3:High-Aperture and Fault-tolerant Pixel Structure for TFT-LCDs," SID 95 Digest, pp. 15–18, May 1995.
Sakamoto et al., "27.3: A High-Aperture-Radio 3-in.-Diagonal VGA a Si Light Valve with Pixel/Data and Pixel/Gate Lines Overlapping," SID 96 Digest, pp. 681–684, 1996. No Date Provided.

Primary Examiner—William L. Sikes
Assistant Examiner—Tai V. Duong
Attorney, Agent, or Firm—Nixon & Vanderhye P.C.

[57] ABSTRACT

A liquid crystal display device includes an insulating substrate, scanning lines formed on a main surface of the insulting substrate, a gate insulating film formed on the main surface and the scanning lines, signal lines formed crossing the scanning lines on the gate insulating film, an interlayer insulating film formed on the scanning lines, the first insulating film and the signal lines, pixel electrodes provided at respective regions defined by respective pairs of adjacent scanning lines and respective pairs of adjacent signal lines on the interlayer insulating film. TFTs provided corresponding to the pixel electrodes near respective cross points between the scanning lines and the signal lines, responsive to respective signals applied from respective ones of the pairs of scanning lines defining respective regions where the corresponding pixel electrodes are formed for connecting or disconnecting respective ones of the pair of signal lines defining the regions to or from the pixel electrodes, and a protection film formed at a peripheral edge of the interlayer insulating film to cover an interface between the interlayer insulating film and the underlying layer. Preferably, the protection film includes a conductive thin film.

17 Claims, 16 Drawing Sheets

LIQUID CRYSTAL DISPLAY DEVICE HAVING A FILM FOR PROTECTING INTERFACE BETWEEN INTERLAYER INSULATING FILM AND UNDERLYING LAYER AND MANUFACTURING METHOD THEREOF

BACKGROUND OF THE INVENTION

1. Field of the Invention

The present invention relates to a liquid crystal display device including switching elements such as thin film transistors (hereinafter referred to as a TFT) and to manufacturing method thereof. More specifically, the present invention relates to a liquid crystal display device and manufacturing method thereof allowing manufacture with high production yield.

2. Description of the Background Art

Referring to FIGS. 1 and 2, a substrate 30 of a conventional active matrix liquid crystal display device includes: a transparent insulating substrate 32 such as a glass, having a main surface; a plurality of gate signal input terminals 34 arranged on opposing two sides of the main surface of insulating substrate 32; a plurality of source signal input terminals arranged on another sets of opposing two sides of insulting substrate 32; a plurality of scanning lines (hereinafter referred to as "gate signal lines") 38 formed on insulating substrate 32; a plurality of signal lines (hereinafter referred to as "source signal lines") 40 arranged orthogonally crossing gate signal lines 38; pixel electrodes 82 formed in regions defined by pairs of adjacent gate signal lines and pairs of adjacent source signal lines 40; TFTs 48 responsive to signals applied from the respective gate signal lines 38 for connecting or disconnecting respective source signal lines 49 to or from respective pixel electrodes 82. At an end portion of insulating substrate 32, gate signal lines 38 and source signal lines 40 are connected to gate signal input terminals 34 and source signal input terminals 36, respectively.

Referring to FIG. 2, each TFT 48 includes: a gate electrode 60 branching from gate signal line 38; a gate insulating film 42 formed on gate electrode 60; a semiconductor layer 62 formed on gate insulating film 42 above gate electrode 60; a channel protection layer 80 formed on a central portion of semiconductor layer 62; and source and drain electrodes 64 and 66 formed on respective sides of channel protection layer 80 to cover respective edges of channel protection layer 80 and to cover left and right portions of semiconductor layer 62.

Liquid crystal display device 30 further includes a transparent electrode 74 formed on gate insulating film 42 to cover an end portion of drain electrode 66, and a metal layer 76 formed on a part of the transparent electrode. Transparent electrode 74 is elongated to be connected to pixel electrode 82, which will be described later, and to an additional capacitance, not shown.

Source signal line 40 includes a transparent electrode 68 formed on gate insulating film 40 and a metal layer 70 formed further thereon.

A branch 72 of source signal line 40 is connected to source electrode 64 of TFT 48, covering an end portion of source electrode 64 (see (A) of FIG. 2)

An interlayer insulating film 44 is formed to cover, among the components described above, gate signal lines 38, source signal lines 40, TFTs 48 and respective portions of source signal input terminals 36. At portions of interlayer insulating film 44 which are on transparent electrodes 74, contact holes 84 are formed. Further, on interlayer insulating film 44, transparent conductive films are formed and, through respective contact holes 84, connected to respective transparent electrodes 74 and further to drain electrodes 66, thus providing pixel electrodes 82.

Especially referring to (B) of FIG. 2, end portions of gate signal lines 38 and an edge of insulating film 42 extend outer than the edge of interlayer insulating film 44, the end portions of gate signal lines 38 further extend outer than the edge of insulating film 42, and transparent electrodes 58 are formed to cover the edge of insulating film 42 and respective exposed portions of gate signal lines 38. Transparent electrodes 58 and gate signal lines 38 therebelow form gate signal input terminals 34. End portions of transparent electrodes 58 are apart from the edge of interlayer insulating film 44.

Referring to (C) of FIG. 2, source signal input terminal 36 includes a conductive layer 50 and a transparent electrode 86 formed on an upper surface thereof, spaced apart from the edge of interlayer insulating film 44.

At the edge portion where source signal input terminals 36 are formed, gate insulating film 42 do not extend to the edge of interlayer insulating film 44. Source signal lines 40 consisting of transparent electrode 68 and metal layers 70 extend further from the end portion of gate insulating film 42 and cover respective portions of source signal input terminals 36. However, they do not extend outer than the interlayer insulating film 44. At portions on source signal input terminals 36 which are outer than interlayer insulating film 44, transparent electrodes 86 are formed.

As described above, since interlayer insulating film 44 is formed between gate and source signal lines 38 and 40 and pixel electrodes 82, pixel electrodes 82 may be overlapped on respective gate and source signal lines 38 and 40. Accordingly the ratio of light transmitting area of the liquid crystal with respect to the entire area can be increased. Further, electric field drived from the signal line 38 or 40 is shielded by interlayer insulating film 44, and therefore unsatisfactory orientation of liquid crystal can be suppressed.

However, the conventional liquid crystal display device suffers from the following problems. During the steps of manufacturing the substrate for the crystal liquid crystal display device, interlayer insulating film 44 is formed through the steps of forming a thin film by applying a photosensitive organic resin on an underlying layer by spin coating, exposing the thin film to a desired pattern by a stepper, and by developing the pattern. In the subsequent steps of manufacturing, a film furhter thereon may be wet patterned using chamicals, for example in the step of etching or resist removal. In such steps, the chamicals used may enter below the interlayer insulating film, through a contact region between interlayer insulating film 44 and underlying layer, near the signal input terminal portion. For example, in the step of etching, a mixture of hydrochloric acid (HCl) and ion chloride (FeCl3) used for etching enters below the interlayer insulating film. In that case, adhesion between interlayer insulating film 44 and underlying layer may possibly be significantly degraded. Worse, a switching element such as TFT may be affected by the chemicals. This leads to lower production yeild of the conventional liquid crystal display device.

SUMMARY OF THE INVENTION

Therefore, an object of the present invention is to provide a liquid crystal display device and manufacturing method thereof which allow higher production yield.

Another object of the present invention is to provide a liquid crystal display device and manufacturing method thereof in which switching element is not affected by chemicals even when the switching element is subjected to a manufacturing step using chemicals.

A still further object of the present invention is to provide a liquid crystal display device and manufacturing method thereof in which an interface between interlayer insulating film and the underlying layer is not affected by chemicals after the step using the chemicals.

An additional object of the present invention is to provide a liquid crystal display device, manufacturing method thereof and a method of removing a defect of the liquid crystal display device, in which even when there is caused a defect in a signal line, the defect can be repaired.

A still further object of the present invention is to provide a liquid crystal display device, manufacturing method thereof and a method of removing defects of the liquid crystal display device, by which even when defects are caused in a plurality of signal lines, the defect can be repaired.

A still further object of the present invention is to provide a liquid crystal display device, manufacturing method thereof and a method of removing a defect of the liquid crystal display device by which, even when a defect is caused in a signal line, the defect can be repaired while display quality of the liquid crystal display device is maintained.

The liquid crystal display device in accordance with the present invention includes: an insulating substrate having a main surface; a plurality of scanning lines formed on the main surface; a first insulating film formed on the main surface and on the scanning lines; a plurality of signal lines formed crossing the plurality of scanning lines on the first insulating film; a second insulating film formed on the plurality of scanning lines, the first insulating film and on the plurality of signal lines; a plurality of pixel electrodes formed on respective regions defined by respective pairs of adjacent scanning lines and respective pairs of adjacent signal lines on the second insulating film; a plurality of switching elements provided corresponding to the plurality of pixel electrodes, near cross point between the plurality of scanning lines and a plurality of signal lines, responsive to respective signals applied from respective ones of the paired scanning lines defining the respective regions where the respective pixel electrodes are formed, for connecting or disconnecting respective ones of the paired signal lines defining the respective regions to or from the respective pixel electrodes; and a protection film formed to cover an interface between the second insulating film and the underlying layer thereof, at a peripheral edge of the second insulating film.

Since the interface between the second insulating film and an underlying layer is protected by the protection film, it is less likely that chemicals used in subsequent manufacturing steps enter the interface between the second insulating film and the underlying layer thereof. Therefore, a possibility of damage to the second insulating film or peeling of a portion of the second insulating layer from the underlying layer can be reduced. As a result, undesirable influence on the switching element can be suppressed and production yield of the liquid crystal display device can be improved.

Preferably, the protection film includes a conductive thin film. Even when there is a defect caused in a scanning line or a signal line, the defect can be removed by short-circuiting that side of the scanning line or the signal line which is not supplied with a signal with the protection film and by supplying a necessary signal to this portion of the protection film, since the protection film is conductive. This further improves production yield of the liquid crystal display device.

More preferably, the conductive thin film includes a transparent conductive film. As the protection film is formed by the transparent conductive film which is the same as the pixel electrode, it becomes possible to form the protection film through the same step as the step for forming the pixel electrodes. Therefore, production yield of the liquid crystal display device can be improved without the necessity of unduly excessive manufacturing steps.

According to another aspect of the present invention, the method of manufacturing a liquid crystal display device includes the steps of: preparing an insulating substrate having a main surface; forming a plurality of scanning lines on the main surface; forming a first insulating film on the main surface and on the scanning lines; forming a plurality of signal lines crossing the plurality of scanning lines on the first insulating film; forming a second insulating film on the plurality of scanning lines, the first insulating film and on the plurality of signal lines; forming a plurality of pixel electrodes in respective regions defined by respective pairs of adjacent scanning lines and respective pairs of adjacent signal lines on the second insulating film; forming a plurality of switching elements corresponding to the plurality of pixel electrodes near respective cross points between the plurality of scanning lines and the plurality of signal lines, responsive to respective signals applied from respective ones of the respective pairs of scanning lines defining the respective regions where the corresponding pixel electrodes are formed for connecting or disconnecting respective ones of the respective pairs of signal lines defining the respective regions to or from the pixel electrodes; and forming a protection film to cover an interface between the second insulating film and the underlying layer thereof at a peripheral edge of the second insulting film.

According to the method of manufacturing the liquid crystal display device, the interface between the second insulating film and the underlying layer is protected by the protection film. Therefore, it is less likely that chemicals used in subsequent manufacturing steps enter the interface between the second insulating film and the underlying layer. Accordingly, possibility of damage to the second insulating film or peeling of a portion of the second insulating film from the underlying layer can be reduced. As a result, undesirable influence on the switching elements can be suppressed, and production yield of the liquid crystal display device can be improved.

According to a still further aspect of the present invention, in a liquid crystal display device including an insulating substrate having a main surface, a plurality of scanning lines formed on the main surface, a first insulating film formed on the main surface and on the scanning lines, a plurality of signal lines formed crossing the plurality of scanning lines on the first insulating film, a second insulating film formed on the plurality of scanning lines, the first insulating film and on the plurality of signal lines, a plurality of pixel electrodes provided in respective regions defined by respective pairs of adjacent scanning lines and respective pairs of adjacent signal lines on the second insulating film, a plurality of switching elements provided corresponding to the plurality of pixel electrodes near respective cross points between the plurality of scanning lines and the plurality of signal lines, responsive to respective signals applied from respective ones of the respective pairs of scanning lines defining the respective regions where the corresponding pixel electrodes are formed for connecting or disconnecting respective ones of the respective paired signal lines defining the respective regions to or from the respective pixel electrodes, and a conductive protection film formed to cover an interface between the second insulating layer and the underlying layer thereof at a peripheral edge of the second insulating film, the method of removing a defect caused in any of the plurality of scanning lines or the plurality of signal lines includes the steps of: short-circuiting the line where a defect is caused to a protection film at a first portion at an end of the defective line opposing to that end which is supplied with a signal, and forming a line connecting that end of the defective line which is supplied with the signal and a second portion of the protection film.

The protection film is conductive. When the end not supplied with the signal of the defective line is short-circuited to the protection film and a line is formed to connect the end supplied with the signal and the protection film, the signal can be supplied to that portion which has not been supplied with the signal of the defective line through the protection film. Thus the defect can be repaired.

Preferably, the method of removing defects of the liquid crystal display device further includes the step of cutting the protection film at a portion outside a region connecting the first and second portions of the protection film. More preferably, the method of removing defects of the liquid crystal display device further includes the step of cutting the protection film at a region opposing to the first cutting portion of the protection film with respect to the region connecting the first and second portions.

As the protection film serving as a signal supply path to the defective line is made smaller, stray capacitance of the signal supply path is reduced. As a result, response of the switching element connected to the defective line can be kept high.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
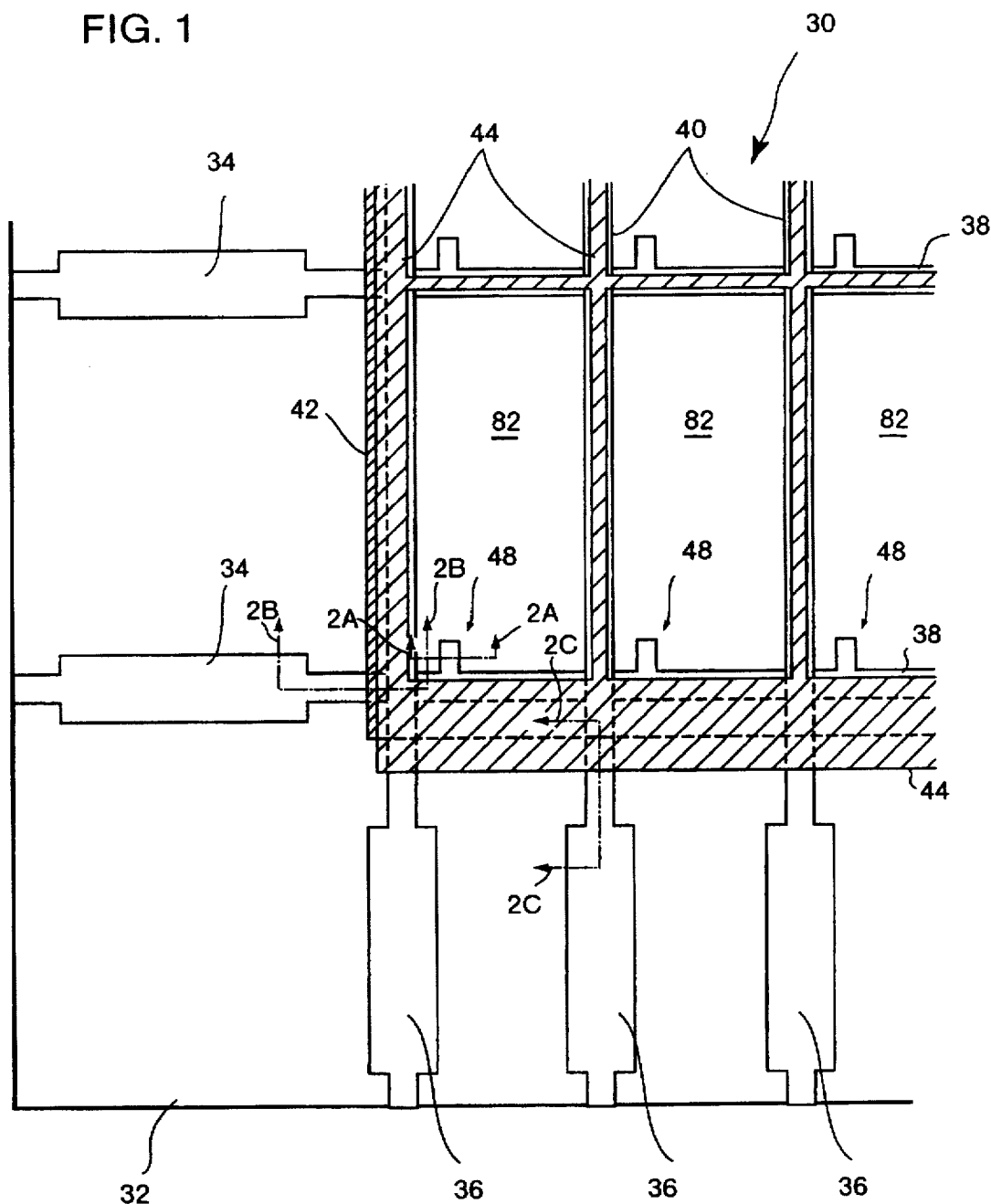
FIG. 1 is a plan view of a substrate of a conventional active matrix liquid crystal display device.
Figure 2:
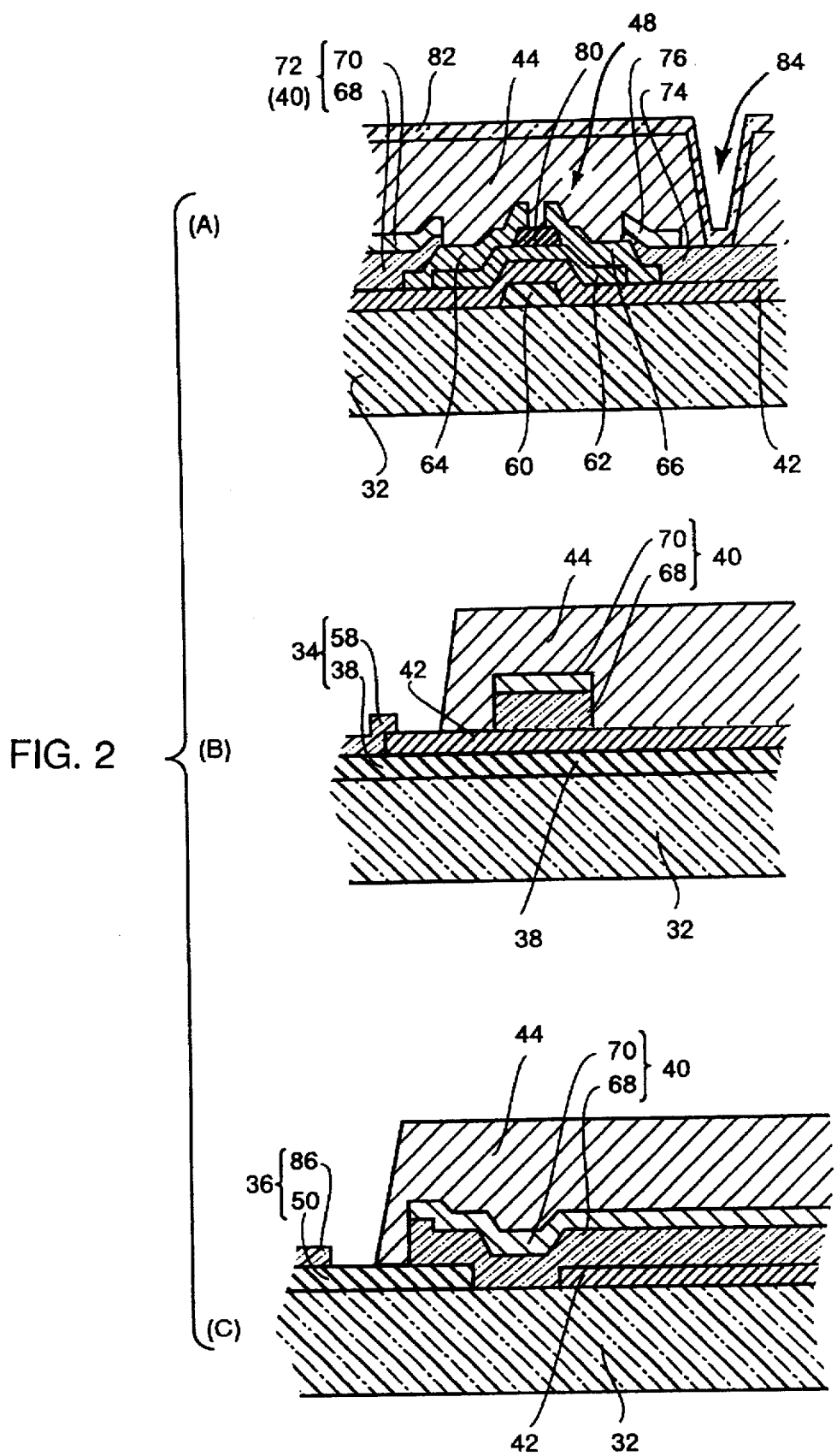
FIGS. 2(A)–(C) show cross sections of the substrate of the liquid crystal display device shown in FIG. 1, taken along the line denoted by reference characters 2A, 2B and 2C.
Figure 3:
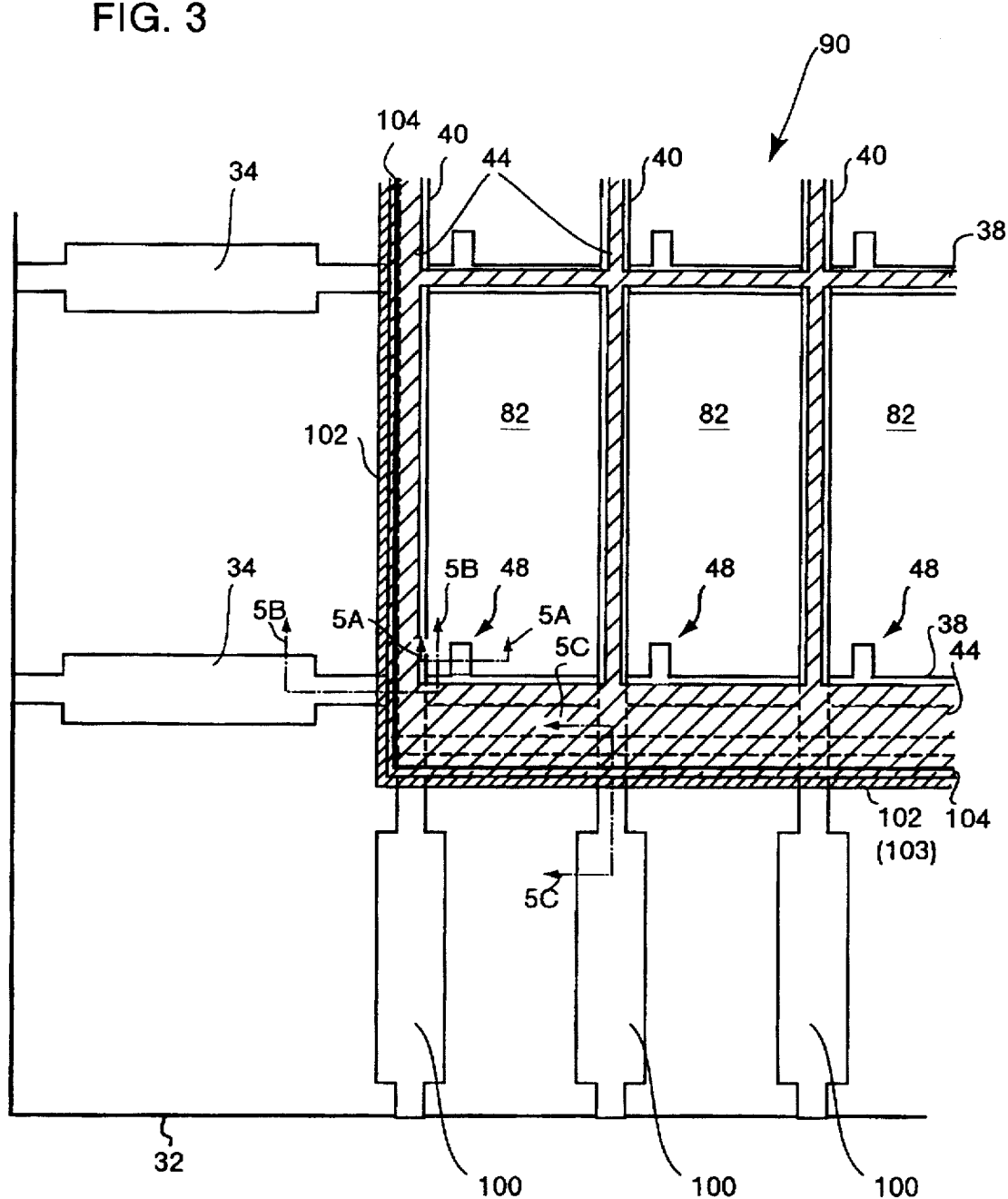
FIG. 3 is a plan view of the active matrix liquid crystal display device in accordance with the present invention.
Figure 13:
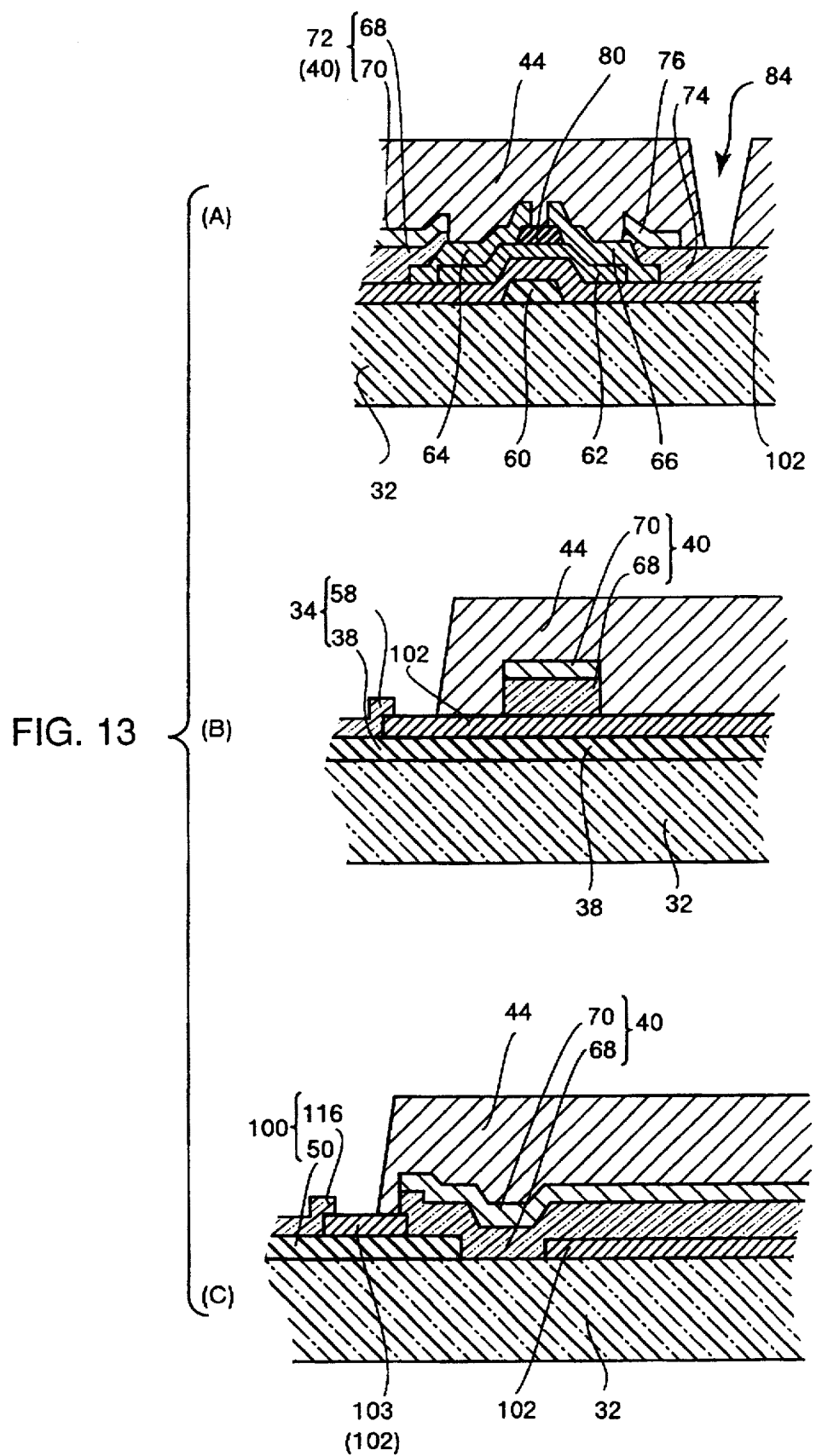
Figure 14:
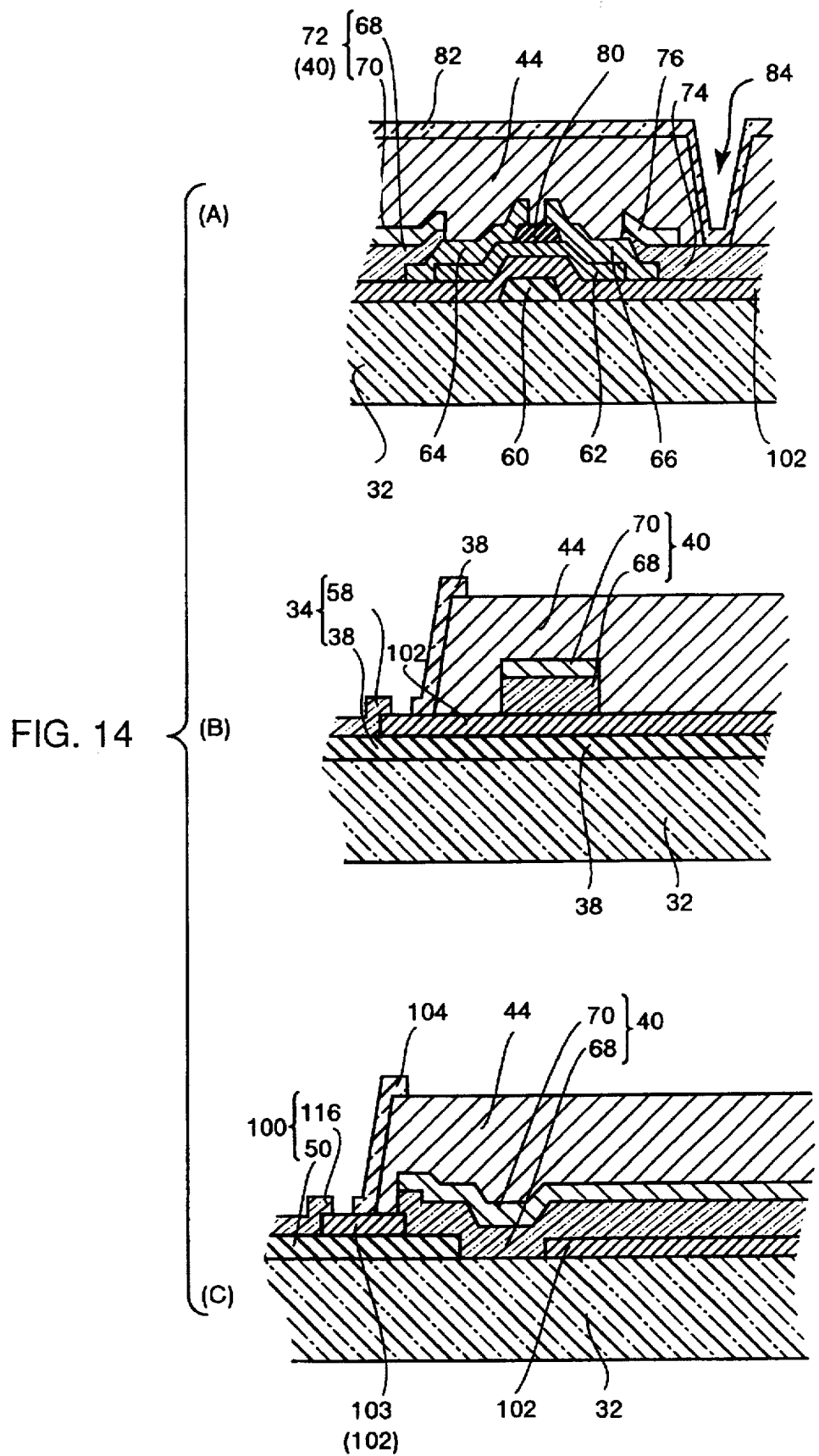

Referring to FIGS. 3 and 14, a substrate 90 of the liquid crystal display device in accordance with a first embodiment of the present invention differs from substrate 30 of the conventional liquid crystal display device shown in FIG. 1 in that, as can be clearly seen from (C) of FIG. 14, a gate insulating film 102 having different pattern is provided instead of gate insulating film 42 of FIGS. 1 and 2, that, as shown in (B) and (C) of FIG. 14, a protection film 104 of a transparent conductive film is newly formed to cover a peripheral surface of an interlayer insulating film 44 and to cover an interface between interlayer insulating film 44 and the underlying layer, at a peripheral edge of interlayer insulating film 44, and that a source signal input terminals 100 are provided instead of source signal input terminals 38 of FIG. 3. In FIGS. 1 and 2 and in FIGS. 3 to 14, corresponding components are denoted by the same reference characters. The components have the same names and functions. Therefore, detailed description thereof is not repeated here.

Gate insulating film 102 has a portion referred to as a short-circuit preventing insulating film 103 formed in a region between interlayer insulating film 44 and source signal input terminals 100 at a peripheral edge portion on the side of source signal input terminals 100 of interlayer insulating film 44, in addition to the region shown in FIGS. 1 and 2 where gate insulating film 42 is formed. Transparent electrodes 86 formed on the upper surface of conductive layer 50 in (C) of FIG. 2 are replaced by transparent electrodes 116 formed on conductive layer 50 and on a portion of short-circuit preventing insulating film 103 thereon in FIG. 14. Conductive films 50 and transparent electrodes 116 on the upper surface thereof provide respective source signal input terminals 100.

As already described, protection film 104 is formed of a transparent conductive film in the present embodiment. Therefore, as will be described later, protection film 104 can be used for repairing a defect caused in a source signal line or a gate signal line. How to repair the defect will be described later with reference to FIGS. 15 and 16.

Figure 4:
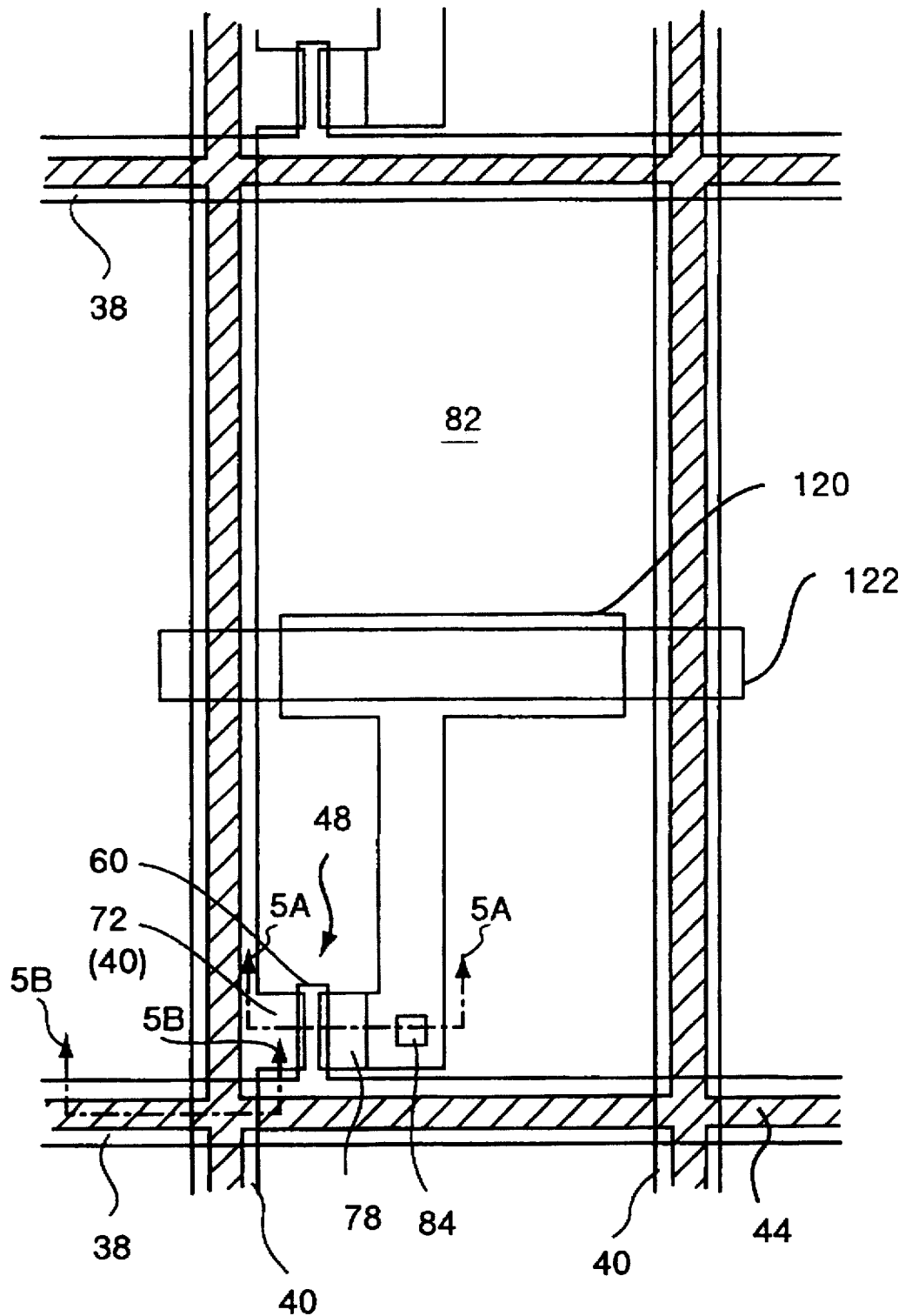
FIG. 4 shows, in enlargement, one pixel region of the active matrix liquid crystal display device in accordance with the present invention.

As shown in FIG. 4, connection line 78 is connected to one (120) of additional capacitance electrodes 120 and 122 through a transparent electrode.

The substrate 90 of the liquid crystal display device having the above described structure is sticked on an opposing substrate on which a color filter or the like is formed, with a spacer interposed, and liquid crystal is introduced between the substrates, whereby a liquid crystal display device is completed.

In the substrate of the liquid crystal display device having the above described structure, protection film 104 is provided covering the interface between interlayer insulating film 44 and the underlying layer thereof. Therefore, even when the substrate surface is subjected to a process using chemicals in the subsequent steps of manufacturing, the chemicals hardly enter below the interlayer insulating film 44 through the interface between interlayer insulating film 44 and the underlying layer. Possibility of damage to the interlayer insulating film 44 or peeling of interlayer insulating film 44 from the underlying layer is small. Therefore, production yield of the liquid crystal display device can be improved.

Further, in the present embodiment, protection film 104 is formed by the same transparent conductive film as the pixel electrode 82. Therefore, it can be formed through the same steps as the pixel electrode 82, as will be described later. Further, short-circuit preventing insulating film 103 is a portion of gate insulating film 102 and it can be formed through the same steps as gate insulating film 102. Therefore, the liquid crystal display device in accordance with the present embodiment can be advantageously manufactured through the same number of steps as the conventional device. Here, protection film 104 may be formed by a material different from that of pixel electrode 82. In that case, the number of steps necessary for manufacturing the substrate for the liquid crystal display device will be larger than for the conventional substrate. If the material of protection film 104 is not conductive, defect of the signal line can not be repaired. However, in any way, the interface between interlayer insulating film 44 and the underlying layer is protected, and hence production yield of the substrate can be made higher than in the conventional example.

Substrate 90 of the liquid crystal display device in accordance with the present invention described above can be manufactured through the following steps.

Figure 5:
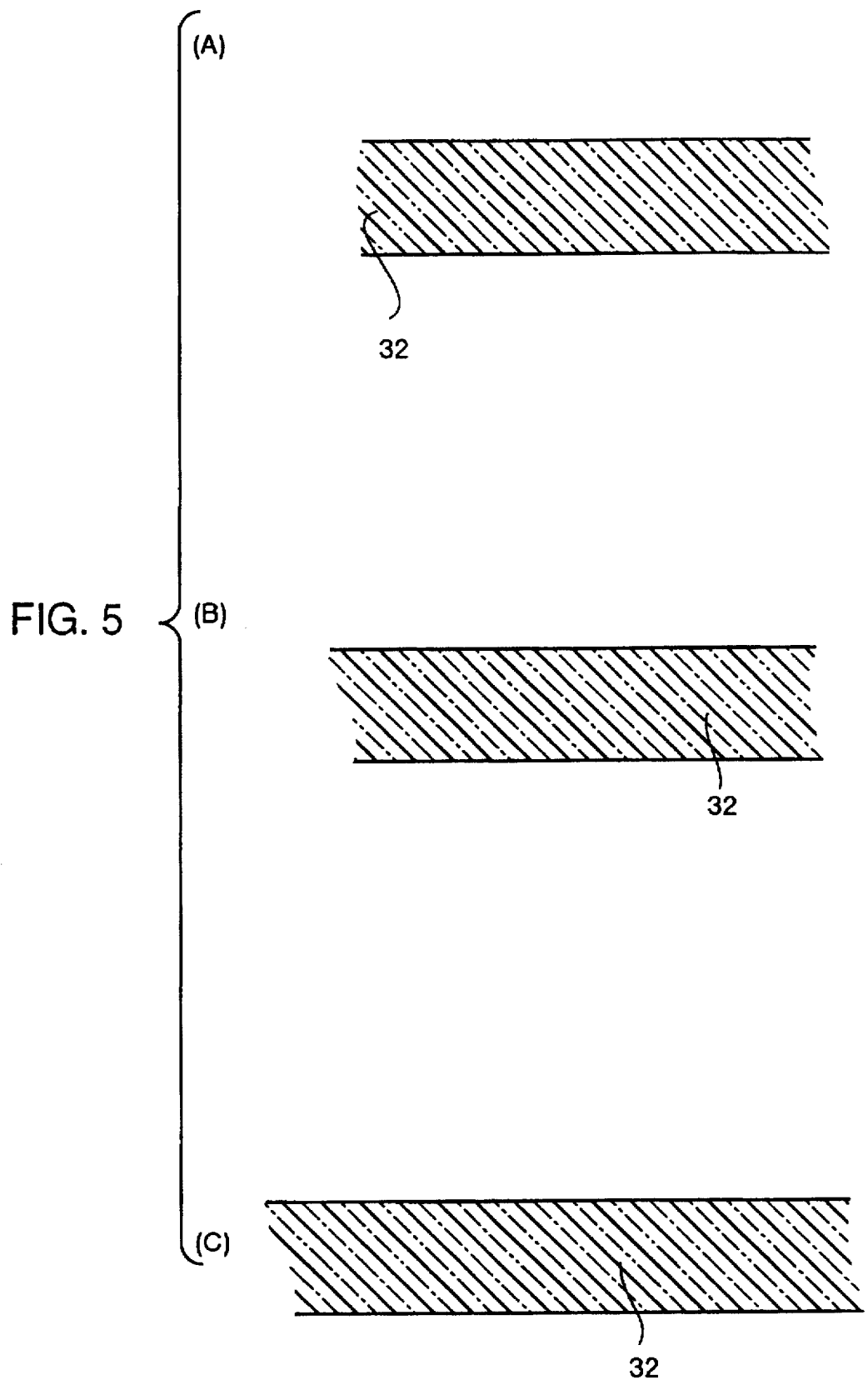
FIGS. 5(A)–(C) to FIGS. 14(A)–(C) show cross sections of three portions of the substrate taken along the lines denoted by reference characters 5A, 5B and 5C, showing the steps of manufacturing the active matrix liquid crystal display device in accordance with the present invention.

First, referring to FIG. 5, a transparent insulating substrate 32 such as a glass substrate is prepared.

Figure 6:
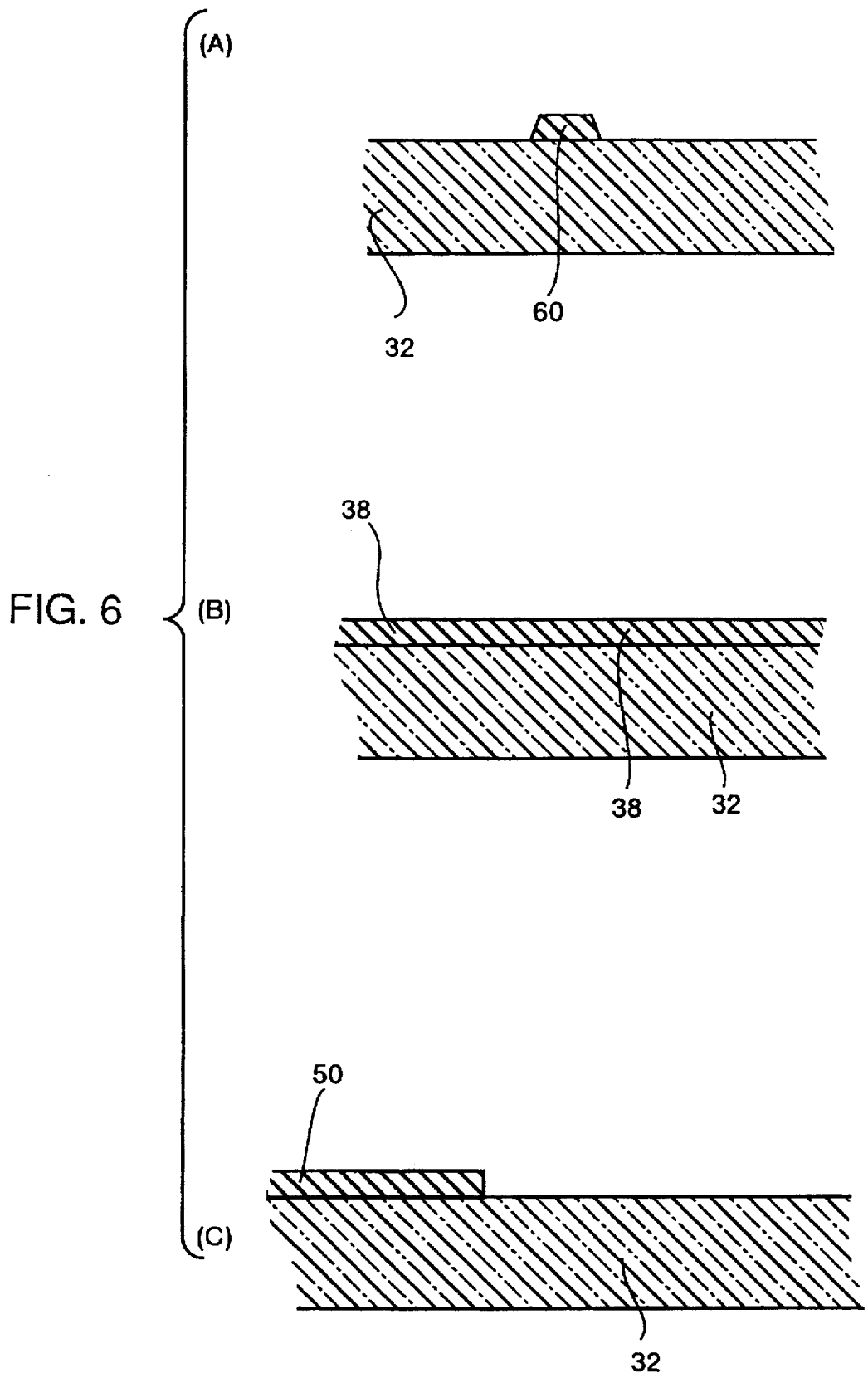

Referring to FIG. 6, on the main surface of insulating substrate 32, a conductive layer of Al, Cr, Ta, MoTa or the like is formed by sputtering, and the layer is patterned to form gate electrode 60, gate signal lines 38 and conductive layer 50. At this time, gate electrode 60 is formed branching from gate signal line 38, as described earlier. Further, of gate signal line 38, a portion near the edge of insulating substrate 32 provides a base portion of gate signal input terminal 34 mentioned above.

Figure 7:
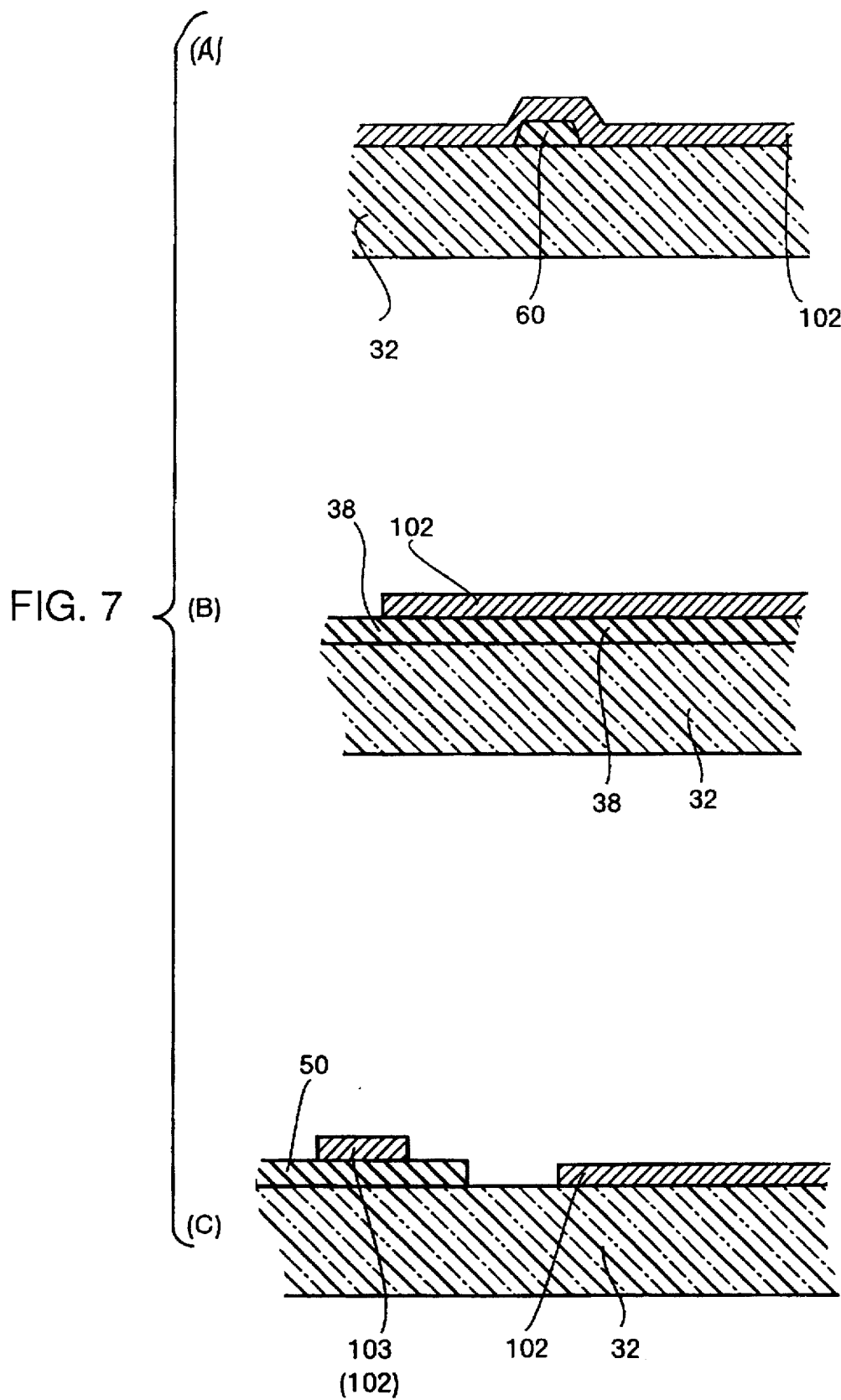

Referring to FIG. 7, SiNx is deposited by the CVD method to cover gate electrode 60, gate signal line 38 and conductive layer 50, and patterned to a desired shape, whereby a gate insulating film 102 including short-circuit preventing insulating film 103 is formed. As the gate insulating film, an insulator such as SiOx, TaOx or AlOx may be used. Also shown in FIG. 3 and (C) of FIG. 7, of gate insulating film 102, short-circuit preventing insulating film 103 covers central portions of all of the conductive layers 50. However, between gate insulating film 102 and short-circuit preventing insulating film 103, there is formed an opening which exposes end portions of conductive layers 50 facing the central portion of insulating substrate 32.

Figure 8:
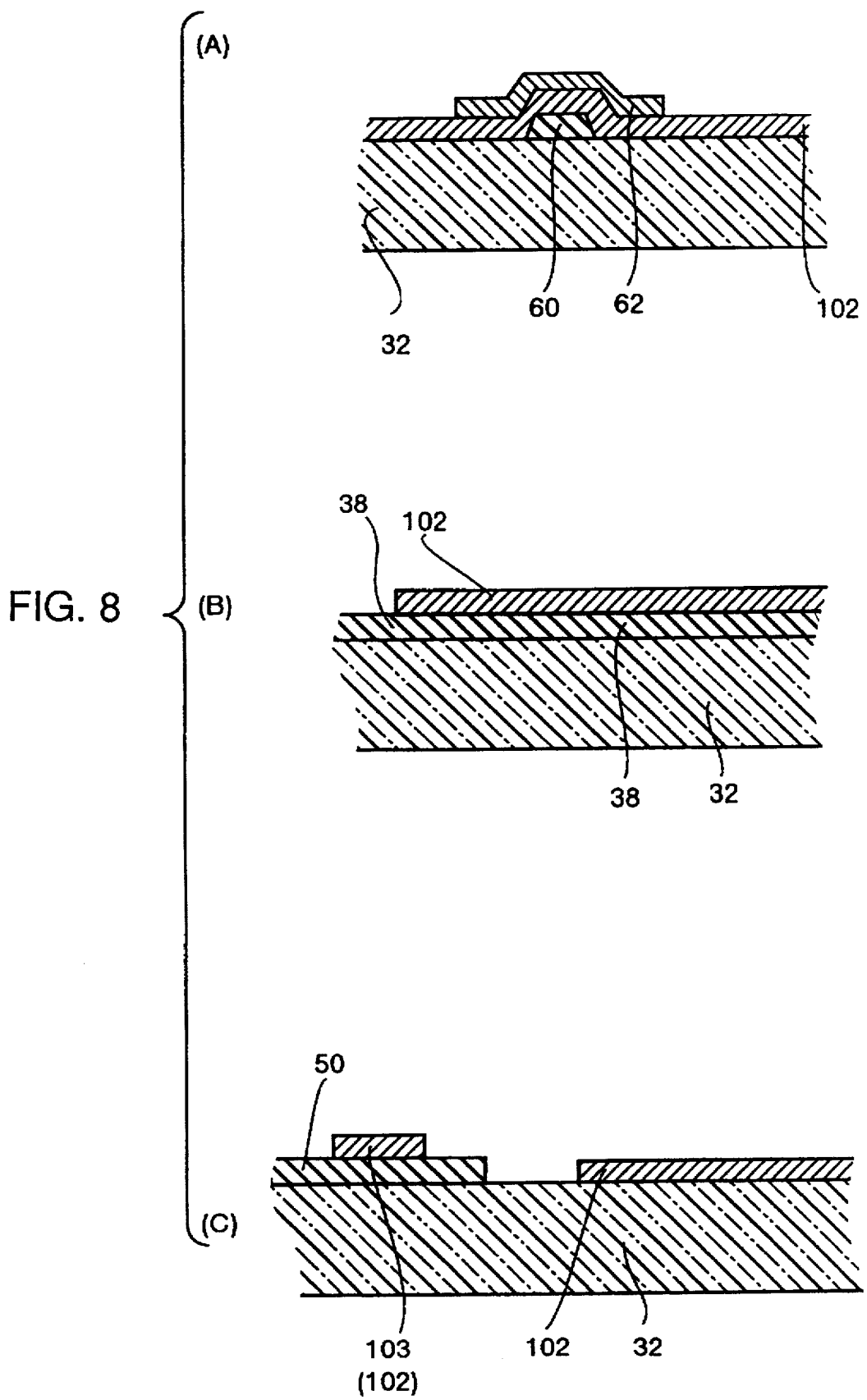

Referring to FIG. 8, a semiconductor layer is formed and patterned to a desired shape, and a semiconductor layer 62 on the gate is formed.

Figure 9:
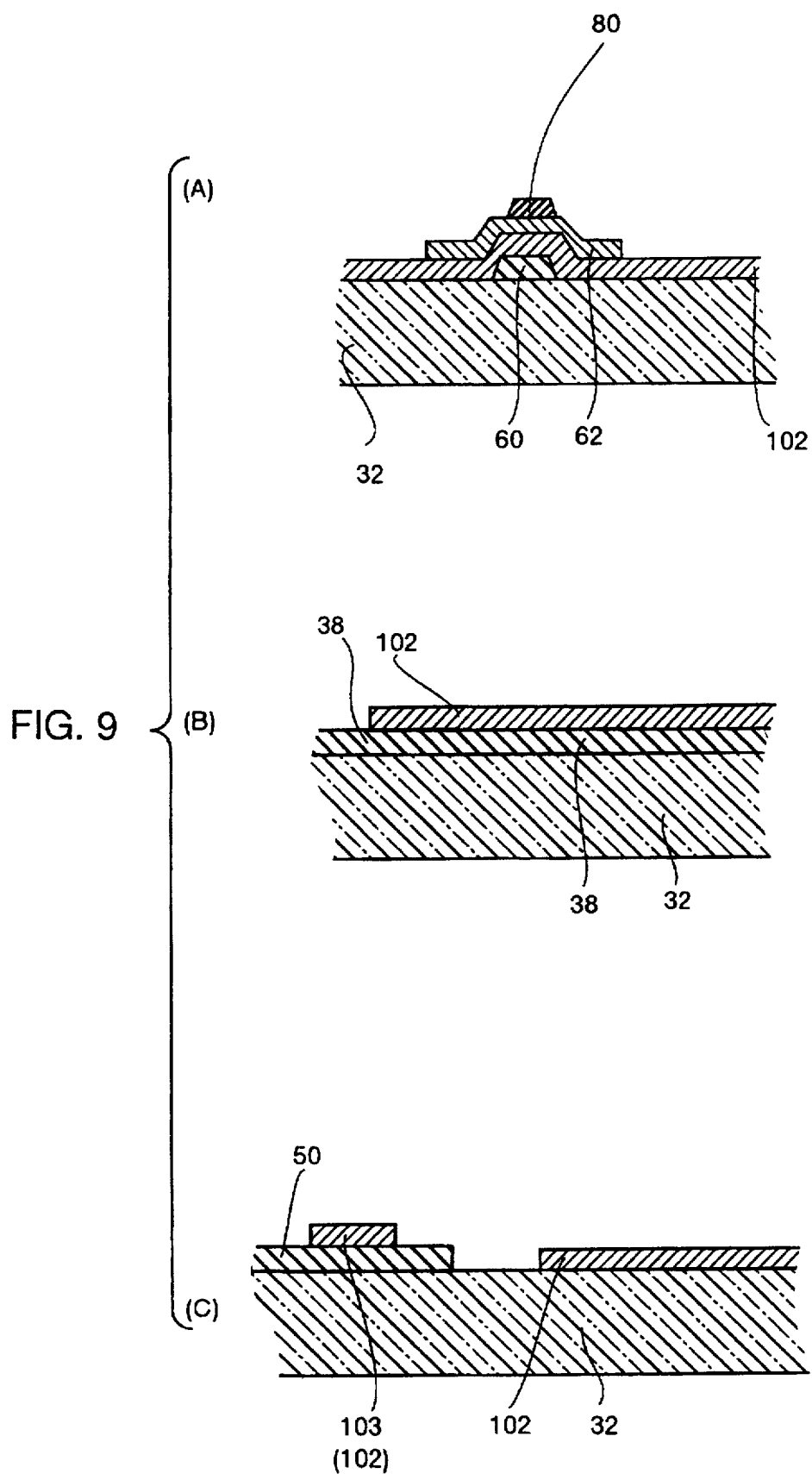

Referring to FIG. 9, a channel protection layer 80 is further formed on semiconductor layer 62.

Figure 10:
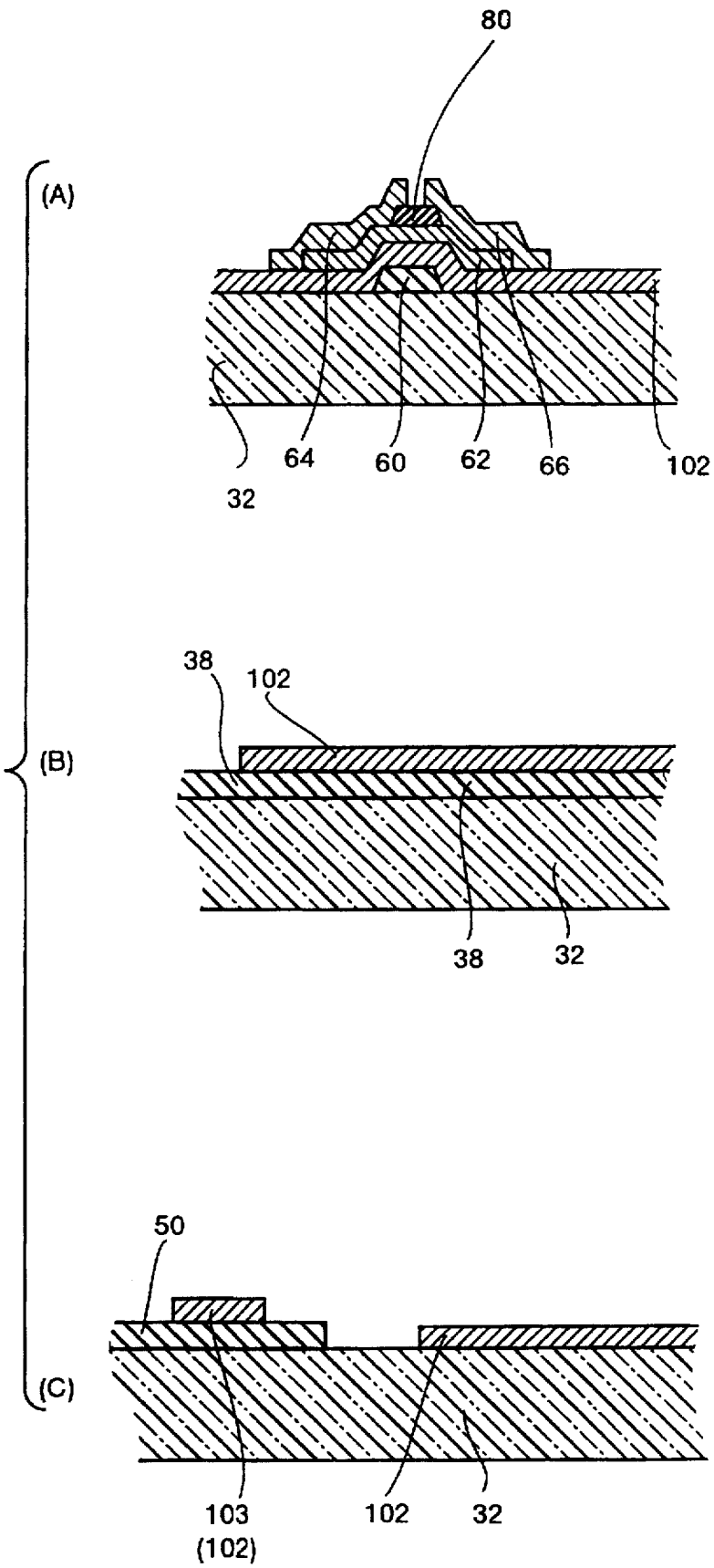

Referring to FIG. 10, on semiconductor layer 62, source and drain electrodes 64 and 66 are formed spaced apart from each other on respective sides of channel protection layer 80.

Figure 11:
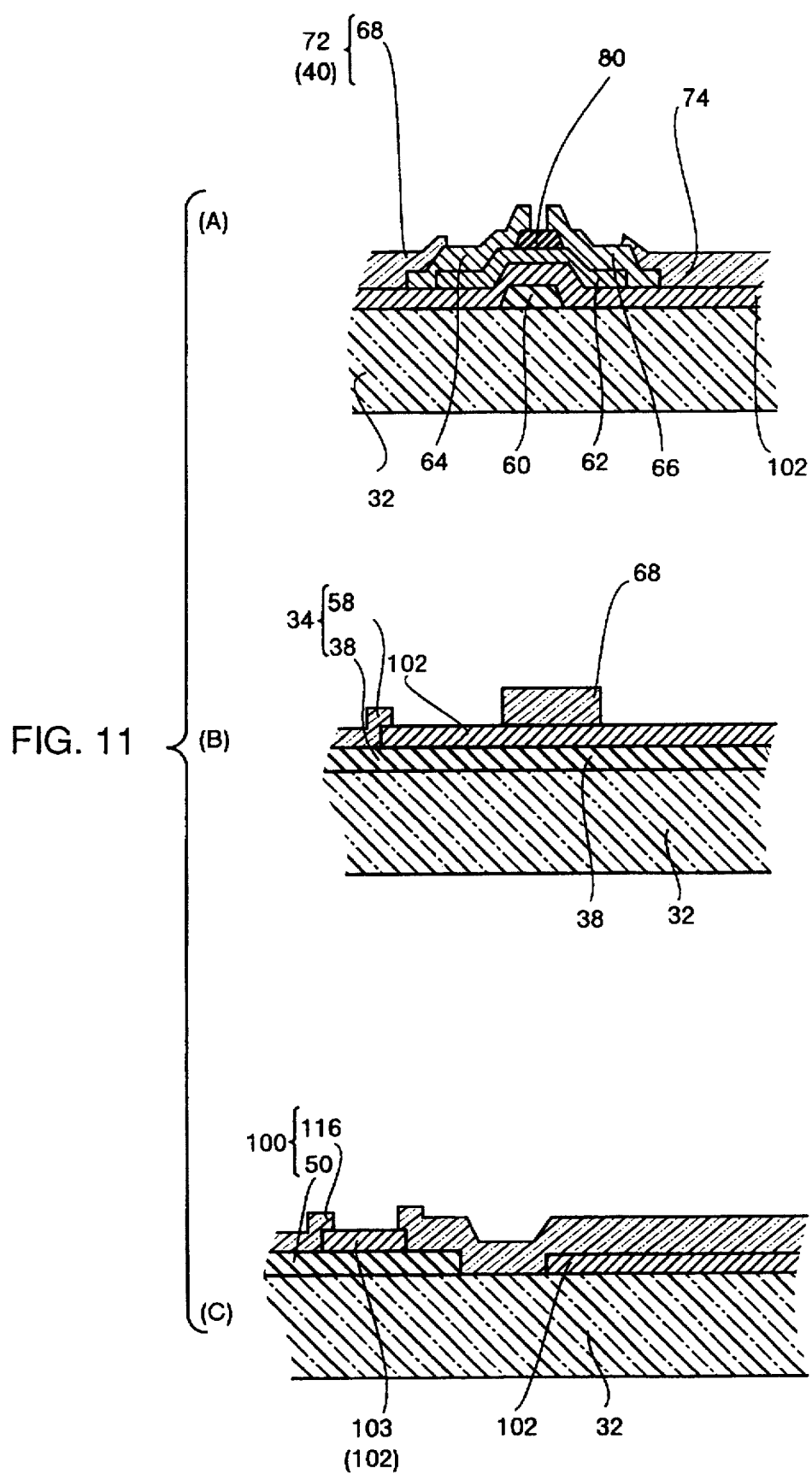

Referring to FIG. 11, on the structure provided through the steps up to FIG. 10, a transparent electrode layer is formed and patterned, whereby transparent electrodes 68 for the source signal lines and transparent electrodes 74 connected to respective drain electrodes 66 are formed. Transparent electrodes 68 are formed to cover outer end portion of short-circuit preventing insulating film 103 and respective conductive layers 50, as shown in (C) of FIG. 11. At the same time, transparent electrodes 58 are formed on respective end portions of gate signal lines 38. Gate signal lines 38 and transparent electrodes 58 thereon provide respective gate signal input terminals 38. Similarly, transparent electrodes 116 are formed spaced apart from end portions of transparent electrodes 68, on the side opposite to transparent electrodes 68 with respect to insulating film 103, of the upper surface of respective conductive layers 50. Transparent electrodes 116 and conductive layers 50 therebelow provide respective source signal input terminals 100. Transparent electrodes 116 are formed to cover respective portions of short-circuit preventing insulating film 103.

Figure 12:
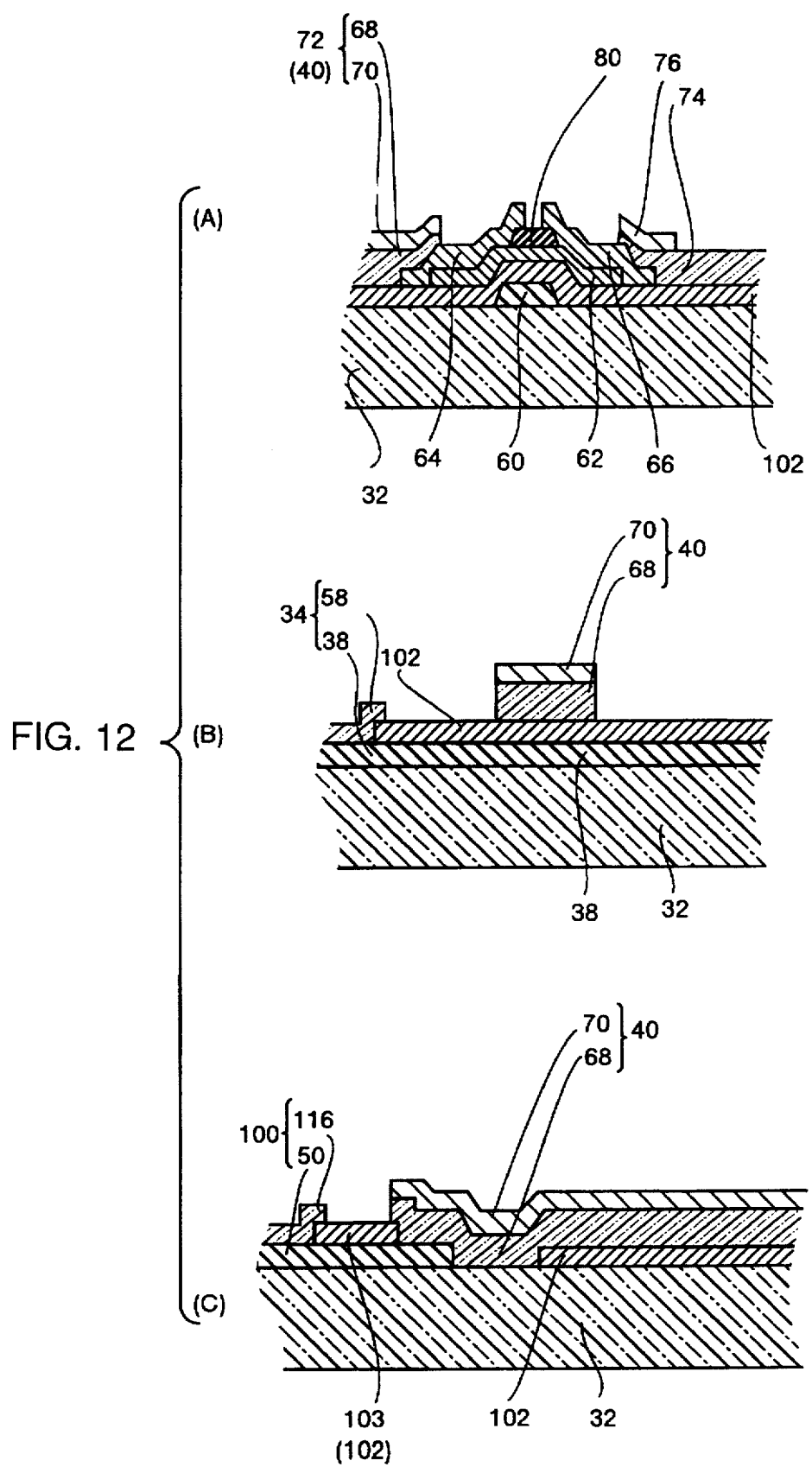

Referring to FIG. 12, a metal layer is further formed and patterned, so that metal layers 70 for the respective source signal lines are formed on respective transparent electrodes 68. At this time, metal layers 76 on the respective drain sides are formed on respective end portions on the side of drain electrode 66 of respective transparent electrodes 74. Transparent electrodes 68 and metal layers 70 thereon provide respective source signal lines 40. Respective portions of source signal lines 40 protrude to be connected to respective source electrodes 64, thus forming source connection lines 72.

Referring to FIG. 13, on the structure formed through the steps up to FIG. 12, a photosensitive acrylic resin is applied to the thickness of about 3 μm by, for example, spin coating. The resin film is exposed in accordance with a desired pattern and processed by an alkali processing liquid, whereby interlayer insulating film 44 is formed.

At this time, interlayer insulating film 44 is patterned such that on the side of gate signal input terminals 34, the end portion thereof is positioned inner than the end portion of gate insulating film 102, and in the vicinity of source signal input terminals 100, the insulating film 44 completely covers source signal lines 40 and that its end portion is positioned on short-circuit preventing insulating film 103 spaced apart from transparent electrode 116. At this time, contact holes 84 are formed through interlayer insulating film 44 on respective transparent electrodes 74 near drain electrodes 66.

Finally, referring to FIG. 14, on the structure formed through the steps up to FIG. 13, a transparent conductive film such as an ITO (Indium Tin Oxide) is formed by sputtering, and the transparent conductive film is patterned to form pixel electrodes 82 and protection film 104.

Pixel electrode 82 has such a planar shape as shown in FIGS. 3 and 4. Pixel electrode 82 is in contact with the underlying transparent electrode 74 in contact hole 84 and, through the same, connected to drain electrode 66.

Protection film 104 is formed as a ring extending over the entire periphery of interlayer insulating film 44, covering the entire surface of the end portion of interlayer insulating film 44 and underlying layer of interlayer insulating film 44, more specifically, a portion of short-circuit preventing insulating film 103 and gate insulating film 102. Therefore, the interface between interlayer insulating film 44 and insulating film 102 or 103 is protected by protection layer 104 from chemicals used for patterning. For example, chemicals are used for etching or removing resist at the time of patterning or the like. Representative chemicals used the time in etching include a mixed liquid of HCl and FeCl3. Protection film 104 prevents entrance of such chemical to the interface between interlayer insulating film 44 and insulating film 102 or 103.

In this manner, protection film 104 is formed using the same material and through the same steps as pixel electrode 82, whereby production yield of the liquid crystal display device can be improved while not making the steps of manufacturing unduly long. It is not necessary either to perform much complicated processing for forming protection film 104.

However, the present invention is not limited to this. For example, protection film 104 may be formed in a step prior to the formation of pixel electrode 82. Therefore, the material of protection film 104 is not limited to a transparent conductor such as ITO. For example, chemical resistance material such as fluorine containing resin generally used for manufacturing an active matrix substrate may be used for protection film 104. Alternatively, metal may be used.

The active matrix substrate manufactured through the above described steps is sticked to an opposing substrate on which a color filter or the like is formed with a spacer interposed, and liquid crystal is introduced to the space therebetween, whereby a liquid crystal display device is completed.

In the liquid crystal display device obtained in this manner, there is hardly a possibility that chemicals used during the steps of manufacturing an active matrix substrate such as etchant or resist removing liquid enters between the entire insulating film and the underlying layer. Therefore, lower production yield of active matrix substrate caused by damage to the interlayer insulating film or peeling of the interlayer insulating film from the underlying layer, which was often experienced in the prior art, can be prevented. Further, the liquid crystal display device in accordance with the present invention can be manufactured through the same number of manufacturing steps as the prior art, by utilizing the steps of manufacturing described above. Therefore, the present invention is advantageous in that it is not necessary to install new facilities for manufacturing the liquid crystal display device in accordance with the present invention.

Further, when protection film 104 of the liquid crystal display device in accordance with the present invention is formed by a conductive material, the present invention further provides the additional effect that, even where there is a defect caused in a bus such as a source signal line or a gate signal line, the defect can be repaired by the protection film 104, as will be described in the following.

Figure 15:
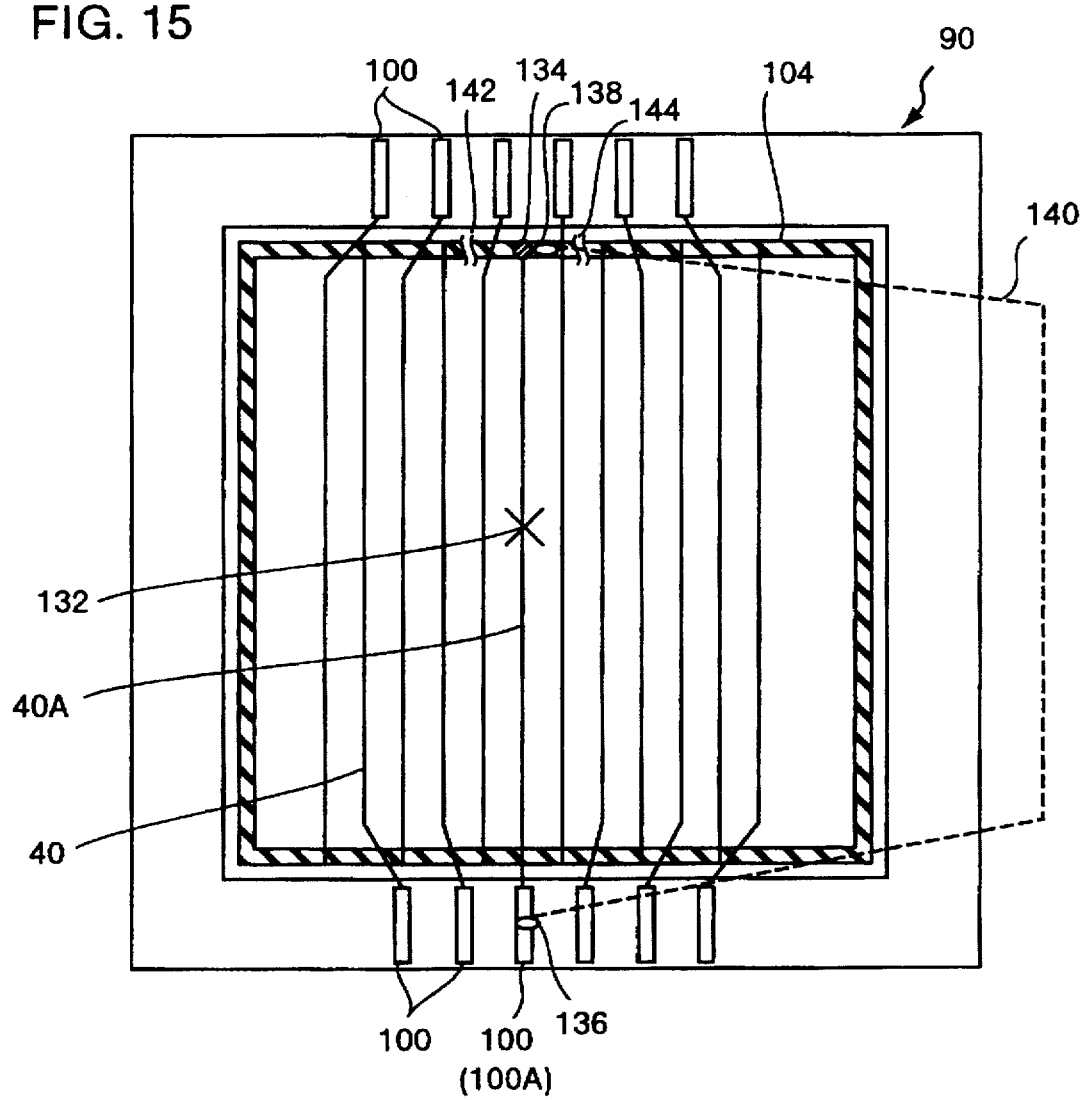
FIG. 15 is a plan view of the substrate showing a method of repairing a defect generated in a signal line, in the active matrix liquid crystal display device in accordance with the present invention.

Referring to FIG. 15, in the liquid crystal display device 90 in accordance with the present invention, protection film 104 is formed over the entire periphery of the interlayer insulating film, as described above. In FIG. 15, only source signal input terminals 100 are shown and gate signal input terminals 34 are not shown, for the simplicity of drawings. In liquid crystal display device 90, assume that there is a defect 132 caused in source signal line 40A which is connected to one (100A) of source signal input terminals 100.

At this time, referring to FIG. 15, at a portion 134 of source signal line 40A at an end portion opposing to source signal input terminal 100A and overlapping protection film 104, source signal line 40A and protection film 104 are short-circuited by laser irradiation, for example. Further, at two portions 142 and 144 on both sides of portion 134, protection film 104 is cut by laser irradiation, for example. An external line 140 is provided for connecting that portion of protection film 104 which has the short-circuited portion 134 to source signal input terminal 100A. External line 140 is connected to source signal input terminal 100A and protection film 104 by solders 136 and 138, respectively.

In this manner, source signal can be supplied to the source signal line 40A on the opposing side to source signal input terminal 100A with respect to defect 132, through external line 140 and protection film 104. As a result, even though there is a defect 132, all the pixels connected to source signal line 40A can be driven normally.

In the foregoing, a source signal line has been described as an example. It is apparent that a defect caused in a gate signal line can be repaired in the similar manner. In the example above, protection film 104 is cut on both sides of the short-circuited portion 134 of source signal line 40A and protection film 104. This is to reduce floating capacitance of the signal supply path to source signal line 40A so as to improve response of pixels. In this manner display quality can be kept high while the defect is removed.

It is preferably but not necessary to cut protection film 104 on both sides of short-circuited portion 134. Protection film 104 may be cut on either side, or it may not be cut at all. In that case, response of pixels connected to source signal line 40A will be lower.

When protection film 104 is formed of a conductive material in the liquid crystal display device of the present invention, it becomes possible to repair defects, when the defects are caused in a plurality of buses, the method of repairing will be described with reference to FIG. 16.

Figure 16:
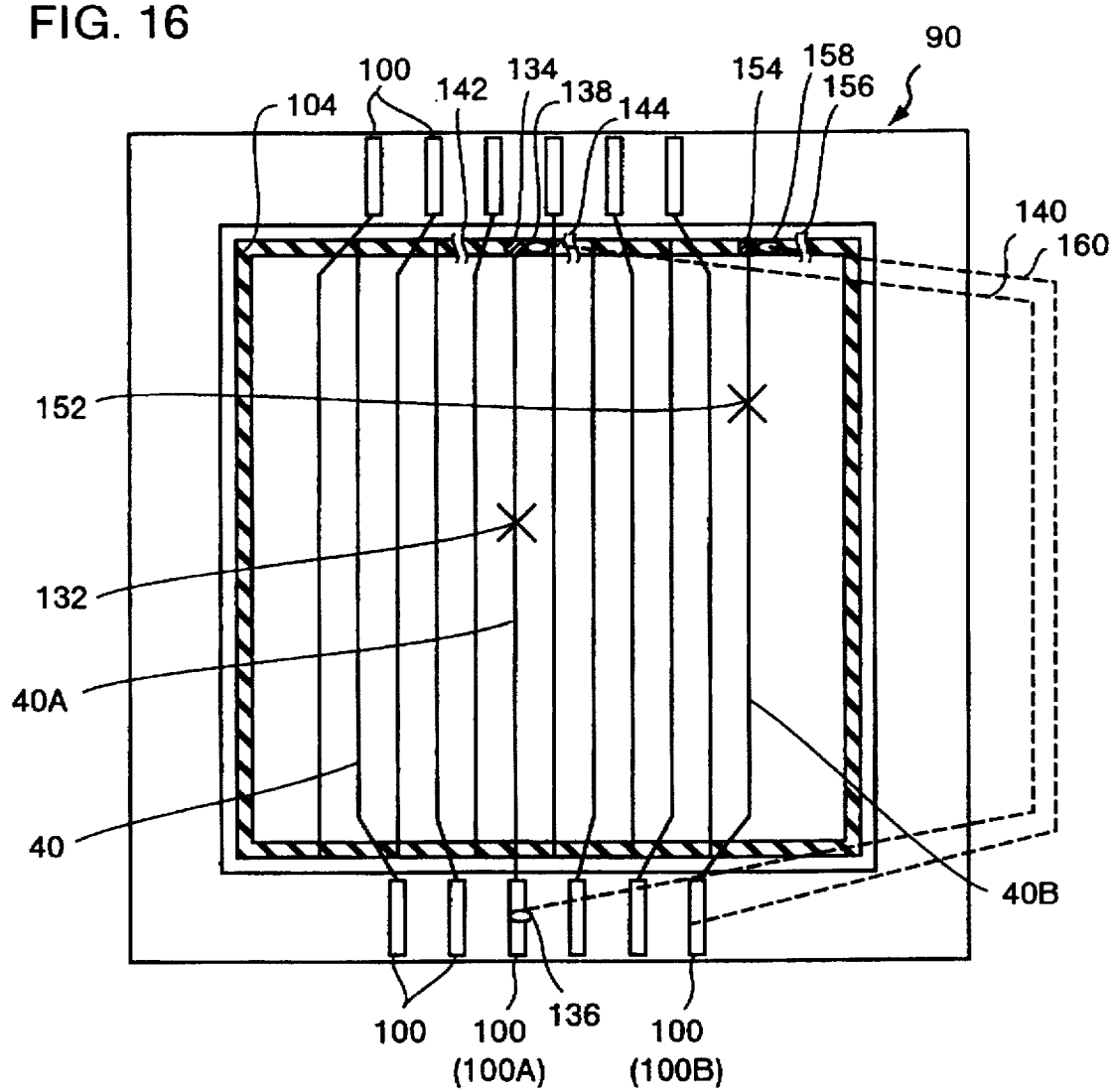
FIG. 16 is a plan view of a substrate showing a method of repairing defects generated in a plurality of signal lines in the active matrix liquid crystal display device in accordance with the present invention.

Referring to FIG. 16, assume that there is a defect 152 caused in source signal line 40B, in addition to defect 132 of source signal line 40A. It is assumed that source signal line 40B is connected to source signal input terminal 100B. In this case also, source signal line 40B and protection film 104 are short-circuited at a portion 154 opposite to source signal input terminal 100B, as described above. Further, protection film 104 is cut at a portion 156 opposing to cut portion 144 with respect to short-circuited portion 154. Then, an external line 160 is provided for connecting the portion 158 connected to source signal line 40B of protection film 104 to source signal input terminal 100B. In this manner, a plurality of defects can be repaired.

Though defects caused in a plurality of source signal lines have been described above, defects caused in the plurality of gate signal lines, or defects caused both in the source and gate signal lines can be repaired in the similar manner.

As described above, in the present invention, a protection film for forming an interface between the interlayer insulating film and the underlying layer thereof is provided at the peripheral edge portion of the interlayer insulating film. This protection film prevents chemicals used in subsequent manufacturing steps from entering the interface between the interlayer insulating film and the underlying layer, and therefore damage to the interlayer insulating film and peeling of the interlayer insulating film from the lower layer can be prevented. As a result, undesired influence on the switching elements can be eliminated, and production yield of the liquid crystal display device can be improved.

It is possible to form the protection film by using the same material through the same steps as the pixel electrodes. Therefore, production yield of the liquid crystal display device can be improved without increasing the number of manufacturing steps and the number of necessary equipments than the prior art.

Further, in the structure of the liquid crystal display device in accordance with the present invention, when the protection film is formed by a conductive thin film, defects caused in the bus can be repaired by utilizing the protection film. Therefore, production yield of the liquid crystal display device can further be improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A liquid crystal display device, comprising:
an insulating substrate having a main surface;

a plurality of scanning lines formed on said main surface;

a first insulating film formed on said main surface and on said scanning lines;

a plurality of signal lines formed crossing said plurality of scanning lines on said first insulating film;

a second insulating film formed on said plurality of scanning lines, said first insulating film and said plurality of signal lines;

a plurality of pixel electrodes each provided on said second insulating film, in respective regions defined by respective pairs of adjacent said scanning lines and respective pairs of adjacent said signal lines;

a plurality of switching elements formed corresponding to said plurality of pixel electrodes near respective cross points between said plurality of scanning lines and said plurality of signal lines, responsive to respective signals applied from respective ones of said pairs of scanning lines defining respective regions where corresponding pixel electrodes are formed, for connecting or disconnecting respective ones of said pairs of signal lines defining said regions to or from respective said pixel electrodes; and a protection film formed at a peripheral edge of said second insulating film for covering the edge of an interface between said second insulating film and an underlying layer thereof.

2. The liquid crystal display device according to claim 1, wherein said underlying layer is said first insulating film.

3. The liquid crystal display device according to claim 2, wherein said protection film includes a conductive thin film.

4. The liquid crystal display device according to claim 3, wherein said conductive thin film includes a transparent conductive film.

5. The liquid crystal display device according to claim 1, wherein each of said switching elements includes a TFT having gate electrode connected to said one of said pair of said scanning lines, a source electrode connected to one of said pair of said signal lines and a drain electrode connected to said pixel electrode.

6. The liquid crystal display device according to claim 5, wherein said underlying layer is said first insulating film.

7. The liquid crystal display device according to claim 6, wherein said protection film includes a conductive thin film.

8. The liquid crystal display device according to claim 7, wherein said conductive thin film includes a transparent conductive film.

9. A method of manufacturing a liquid crystal display device, comprising the steps of:

preparing an insulating substrate having a main surface;

forming a plurality of scanning lines on said main surface;

forming a first insulating film on said main surface and on said scanning lines;

forming a plurality of signal lines crossing said plurality of scanning lines on said first insulating film;

forming a second insulating film on said plurality of scanning lines, said first insulating film and said plurality of signal lines;

forming a plurality of pixel electrodes on said second insulating film, in respective regions defined by respective pairs of adjacent said scanning lines and respective pairs of adjacent said signal lines;

forming a plurality of switching elements corresponding to said plurality of pixel electrodes near respective cross points between said plurality of scanning lines and said plurality of signal lines, responsive to respective signals applied from respective ones of said respective pairs of scanning lines defining respective regions where corresponding pixel electrodes are formed for connecting or disconnecting respective ones of said pairs of signal lines defining said respective regions to or from respective said pixel electrodes; and forming a protection film at a peripheral edge of said second insulating film to cover the edge of an interface between said second insulating film and an underlying layer thereof.

10. The method of manufacturing a liquid crystal display device according to claim 9, wherein said underlying layer is said first insulating film.

11. The method of manufacturing a liquid crystal display device according to claim 10, wherein said step of forming said protection film includes the step of forming a conductive film at a peripheral edge of said second insulating film to cover the edge of an interface between said second insulating film and an underlying layer thereof.

12. The method of manufacturing a liquid crystal display device according to claim 11, wherein said step of forming said conductive thin film includes the step of forming a transparent conductive film at a peripheral edge of said second insulating film to cover the edge of an interface between said second insulating film and the underlying layer thereof.

13. The method of manufacturing a liquid crystal display device according to claim 9, wherein said step of forming said pixel electrodes and said step of forming said protection film are performed simultaneously.

14. The method of manufacturing a liquid crystal display device according to claim 9, wherein each of said switching elements includes a TFT having a gate electrode connected to said one of said pair of said scanning lines, a source electrode connected to said one of said pair of said signal lines and a drain electrode connected to said pixel electrode.

15. In a liquid crystal display device including an insulating substrate having a main surface, a plurality of scanning lines formed on said main surface, a first insulating film formed on said main surface and said scanning lines, a plurality of signal lines formed crossing said plurality of scanning lines on said first insulating film, a second insulating film formed on said plurality of scanning lines, said first insulating film and said plurality of signal lines, a plurality of pixel electrodes provided on said second insulating film, in respective regions defined by respective pairs of adjacent said scanning lines and respective pairs of adjacent said signal lines, a plurality of switching elements provided corresponding to said plurality of pixel electrodes near respective cross points between said plurality of scanning lines and said plurality of signal lines, responsive to respective signals applied from respective ones of said pairs of scanning lines defining respective regions where corresponding pixel electrodes are formed for connecting or disconnecting respective ones of said pair of said signal lines defining respective said regions to or from respective said pixel electrodes, and a conductive protection film formed at a peripheral edge of said second insulating film to cover the edge of an interface between said second insulating film and an underlying layer thereof, a method of removing a defect caused in any of said plurality of scanning lines or said plurality of signal lines, comprising the steps of;

short-circuiting, at a first portion of an end portion of a line in which a defect is caused opposing to an end portion to which a signal is applied, said line in which said defect is caused and said protection film, and forming a line for connecting said end to which a signal is applied of said line in which said defect is caused and a second portion of said protection film.

16. The method of removing a defect of a liquid crystal display device according to claim 15, further comprising the step of:

cutting said protection film at one portion out of a region connecting said first and second portions of said protection film.

17. The method of removing a defect of a liquid crystal display device according to claim 16, further comprising the step of:

cutting said protection film at a portion in a region opposing to said one portion with respect to the region connecting said first and second portions, of said protection film.

* * * * *